(12) United States Patent
Kurino

(10) Patent No.: US 12,491,654 B2
(45) Date of Patent: Dec. 9, 2025

(54) OPTICAL FIBER CUTTER

(71) Applicant: SUMITOMO ELECTRIC OPTIFRONTIER CO., LTD., Kanagawa (JP)

(72) Inventor: Shinsuke Kurino, Yokohama (JP)

(73) Assignee: SUMITOMO ELECTRIC OPTIFRONTIER CO., LTD., Kanagawa (JP)

( * ) Notice: Subject to any disclaimer, the term of this patent is extended or adjusted under 35 U.S.C. 154(b) by 206 days.

(21) Appl. No.: 18/547,919

(22) PCT Filed: Feb. 25, 2022

(86) PCT No.: PCT/JP2022/007889
§ 371 (c)(1),
(2) Date: Aug. 25, 2023

(87) PCT Pub. No.: WO2022/181766
PCT Pub. Date: Sep. 1, 2022

(65) Prior Publication Data
US 2025/0018590 A1    Jan. 16, 2025

(30) Foreign Application Priority Data
Feb. 26, 2021    (JP) .................................. 2021-029976

(51) Int. Cl.
*B26D 7/18*    (2006.01)
*B26D 3/28*    (2006.01)
B26D 7/00    (2006.01)

(52) U.S. Cl.
CPC .................. *B26D 7/18* (2013.01); *B26D 3/28* (2013.01); *B26D 2007/0018* (2013.01)

(58) Field of Classification Search
CPC ... G02B 6/25; B26D 7/18; B26D 3/28; B26D 2007/0025; B26D 2007/0018
USPC ........................................................... 83/109
See application file for complete search history.

(56) References Cited

U.S. PATENT DOCUMENTS

| | | |
|---|---|---|
| 8,967,025 B2 | 3/2015 | Ishihara et al. |
| 2010/0183273 A1 | 7/2010 | Heidler et al. |
| 2013/0056376 A1 | 3/2013 | Hasegawa et al. |
| 2013/0098215 A1 | 4/2013 | Ishihara et al. |
| 2019/0210238 A1 | 7/2019 | Zhao |

FOREIGN PATENT DOCUMENTS

| | | | |
|---|---|---|---|
| CN | 202575526 U | 12/2012 | |
| CN | 110850525 A | * 2/2020 | .............. B21F 11/00 |
| JP | 2001-296430 A | 10/2001 | |

(Continued)

*Primary Examiner* — Nhat Chieu Q Do
(74) *Attorney, Agent, or Firm* — MCDONALD HOPKINS LLC

(57) ABSTRACT

An optical fiber cutter that cleaves a part of an optical fiber, the optical fiber cutter comprising: an openable and closable clamp configured to hold the optical fiber, and a movable blade portion configured to scratch the optical fiber held by the clamp. The optical fiber cutter further comprises a scrape collection mechanism configured to collect scraps of the cleaved optical fiber. The scrape collection mechanism includes a case configured to accommodate the scraps, and a lid portion configured to open and close with respect to the case in conjunction with an opening and closing operation of the clamp.

2 Claims, 14 Drawing Sheets

(56) References Cited

FOREIGN PATENT DOCUMENTS

| | | | |
|---|---|---|---|
| JP | 2003-165740 | A | 6/2003 |
| JP | 2012-003064 | A | 1/2012 |
| JP | 2012-073375 | A | 4/2012 |
| JP | 2014-089272 | A | 5/2014 |

* cited by examiner

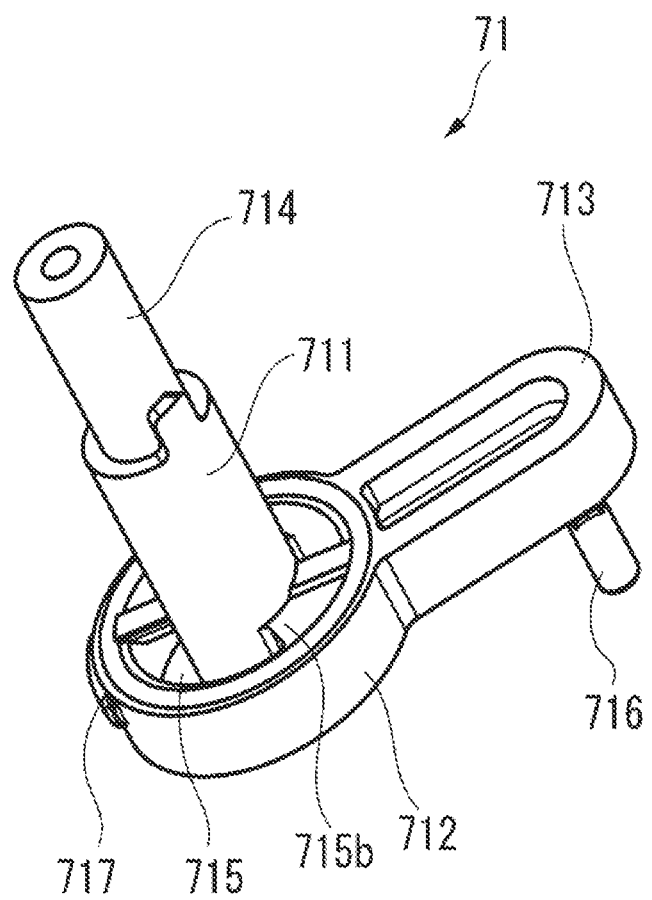

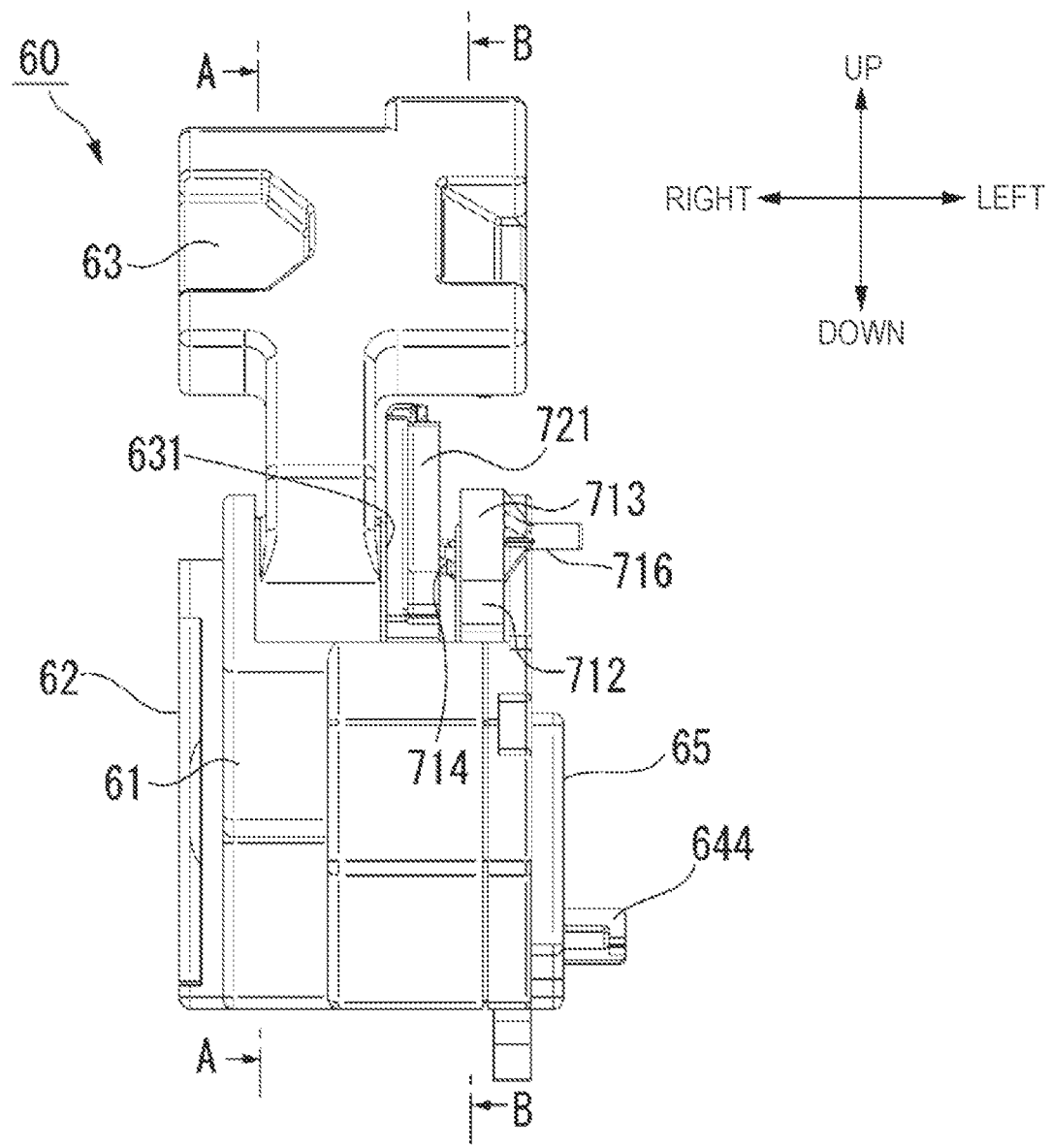

OPTICAL FIBER CUTTER

CROSS REFERENCE TO RELATED APPLICATION

The present application is a National Stage application of PCT/JP2022/007889 filed on Feb. 25, 2022 which claims priority from Japanese Patent Application No. 2021-029976 filed on Feb. 26, 2022. The contents of these applications are incorporated herein by reference in their entireties.

TECHNICAL FIELD

The present disclosure relates to an optical fiber cutter.
The present application claims priority based on Japanese Application No. 2021-029976 filed on Feb. 26, 2021, and incorporates all the descriptions described in the Japanese Application.

BACKGROUND ART

Patent Literature 1 and Patent Literature 2 disclose an optical fiber cutter that cleaves an optical fiber by making an initial scratch. The optical fiber cutters disclosed in Patent Literature 1 and Patent Literature 2 include a collection mechanism for collecting scraps of cleaved optical fibers.

CITATION LIST

Patent Literature

Patent Literature 1: JP2001-296430A
Patent Literature 2: JP2012-73375A

SUMMARY OF INVENTION

According to an aspect of the present disclosure, there is provided an optical fiber cutter that cleaves a part of an optical fiber, the optical fiber cutter including:
- an openable and closable clamp configured to hold the optical fiber; and
- a movable blade portion configured to scratch the optical fiber held by the clamp, in which
- a scrap collection mechanism configured to collect scraps of the cleaved optical fiber is further provided, and
- the scrap collection mechanism includes a case configured to accommodate the scraps, and a lid portion configured to open and close with respect to the case in conjunction with an opening and closing operation of the clamp.

BRIEF DESCRIPTION OF DRAWINGS

FIG. 3B is a perspective view of the drive lever provided in the scrap collection mechanism of FIG. 2.
FIG. 5B is a rear view of the scrap collection mechanism in the initial state.

DESCRIPTION OF EMBODIMENTS

Technical Problem

Figure 1:
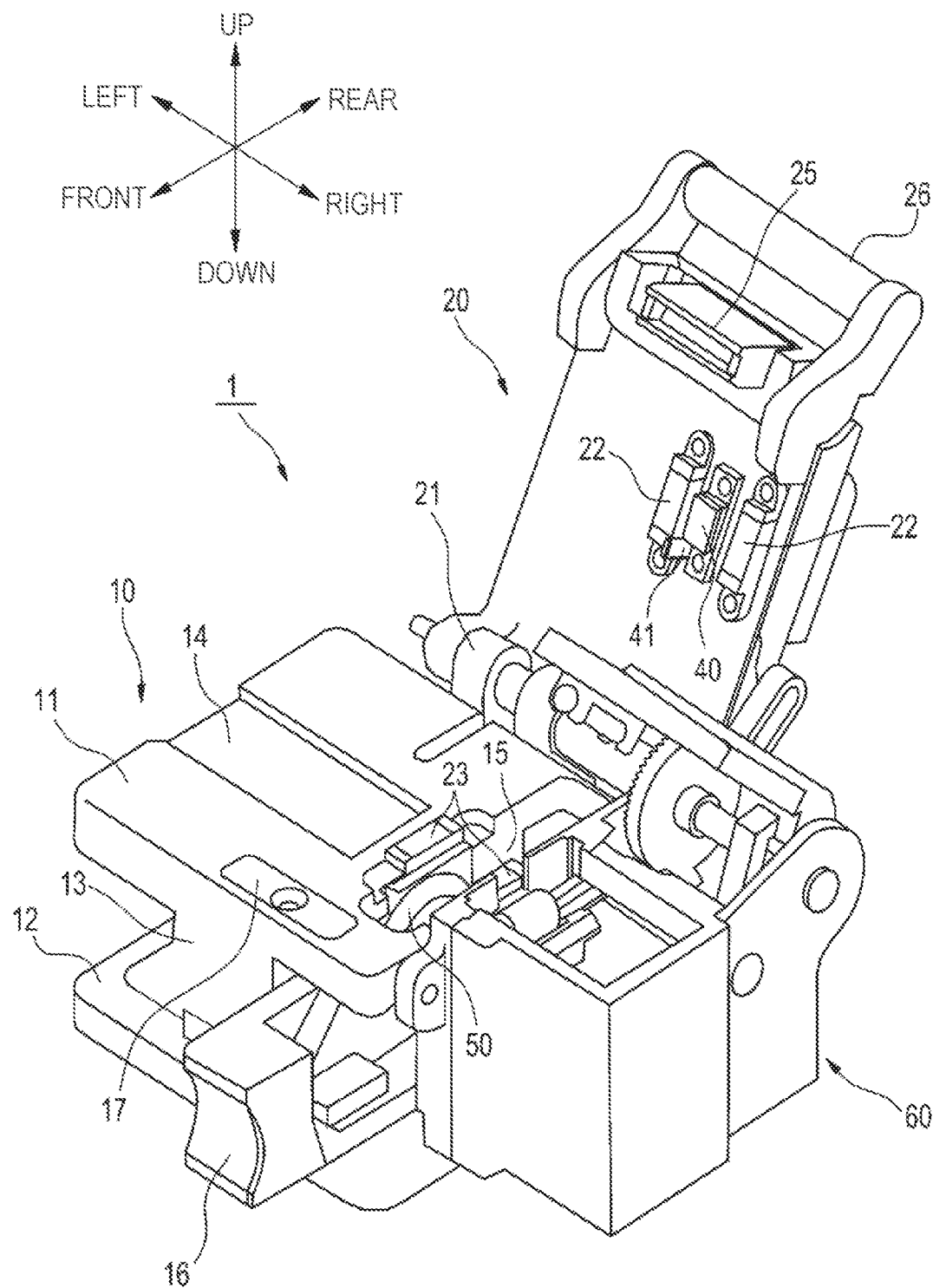
FIG. 1 is a perspective view of an optical fiber cutter according to the present embodiment.

In an optical fiber cutter of the related arts including a scrap collection mechanism, the lid portion of the scrap collection mechanism needs to be opened and closed manually.
Accordingly, an object of the present disclosure is to provide an optical fiber cutter capable of improving work efficiency during optical fiber cleave work and scrap collection work.

Solution to Problem

First, the embodiments of the present disclosure are listed and described.
According to an aspect of the present disclosure, (1) there is provided an optical fiber cutter that cleaves a part of an optical fiber, the optical fiber cutter including:
- an openable and closable clamp configured to hold the optical fiber; and
- a movable blade portion configured to scratch the optical fiber held by the clamp, in which
- a scrap collection mechanism configured to collect scraps of the cleaved optical fiber is further provided, and
- the scrap collection mechanism includes a case configured to accommodate the scraps, and a lid portion configured to open and close with respect to the case in conjunction with an opening and closing operation of the clamp.

According to the present disclosure, since the lid portion of the scrap collection mechanism automatically opens and closes in conjunction with the opening and closing operation of the clamp, it is possible to improve the work efficiency during the optical fiber cleave work and the scrap collection work.

(2) The scrap collection mechanism may further include a rotating roller provided in the case and configured to hold and feed out the scraps in a direction away from the clamp, and a driving unit configured to transmit an opening operation of the clamp to the lid portion and the rotating roller.

According to the present disclosure, since the driving unit is provided to transmit the clamping operation to both the lid portion and the rotating roller, it is possible to provide an optical fiber cutter with a significantly improved workability and a small number of parts.

(3) The driving unit may transmit a closing operation of the clamp to the lid portion and may not transmit the closing operation to the rotating roller.

According to the present disclosure, the rotating roller is not rotated when the clamp is closed. That is, the rotating roller is only rotated to send the scraps in the direction away from the clamp. As a result, for example, even when scraps adhere to the rotating roller, it is possible to prevent the scraps from being pulled back toward the clamp when the lid is closed together with the clamp.

(4) The driving unit may include a drive lever configured to interlock with the clamp, and a first gear configured to rotate according to an operation of the drive lever, the rotating roller may integrally include a second gear at one end of the rotating roller, and
the first gear may move toward the second gear and be directly or indirectly engaged with the second gear according to the operation of the drive lever interlocked with the opening operation of the clamp, and move toward an opposite side of the second gear and be disengaged from the second gear according to an operation of the drive lever interlocked with the closing operation of the clamp.

According to the present disclosure, a configuration in which the rotating roller rotates only in the direction away from the clamp can be implemented simply and with a small number of parts.

(5) The clamp and the lid portion of the scrap collection mechanism may be opened and closed by rotating around rotation axes parallel to each other.

According to the present disclosure, it is possible to implement an interlocking mechanism between the clamp and the lid portion with a simple configuration.

Advantageous Effects of Invention

According to the present disclosure, since the lid portion of the scrap collection mechanism automatically opens and closes in conjunction with the opening/closing operation of the clamp, it is possible to improve the work efficiency during the optical fiber cleave work and the scrap collection work.

DESCRIPTION OF EMBODIMENTS

A specific example of an optical fiber cutter according to an embodiment of the present disclosure will be described below with reference to the drawings.

The present disclosure is not limited to the examples, but is indicated by the scope of the claims, and it is intended that all modifications within meaning and scope equivalent to the claims are included.

FIG. 1 is a perspective view of an optical fiber cutter according to the present embodiment.

An optical fiber cutter 1 includes a main body 10, a clamp 20 that holds a bare optical fiber, a pillow 40 for bending the bare optical fiber, a disc-shaped blade portion 50 for making an initial scratch on the bare optical fiber, and a scrap collection mechanism 60 for the bare optical fiber.

The main body 10 is a metal block having a substantially I-shaped cross section, in which an upper main body 11 and a lower main body 12 are connected by a connecting piece 13. A holder guide 14 for mounting an optical fiber holder (not shown) is formed on the upper surface thereof. An optical fiber holder is a device that holds an optical fiber or a plurality of optical fibers in a parallel state. An exposure hole 15 for the blade portion 50 is formed in the upper main body 11, and the blade portion 50 protrudes upward from the exposure hole 15. A slider 16 for making the blade portion 50 slidable in a front-rear direction is mounted on the connecting piece 13. Since the configuration of the slider 16 is well known, detailed description thereof will be omitted. A pair of lower clamps 23 are fixed on the upper surface of the main body 10 to sandwich the exposure hole 15 therebetween.

The clamp 20 is a plate-shaped body attached to a rear end of the upper surface of the main body 10 via a spindle 21 to be freely opened and closed. The pillow 40 and a pair of upper clamps 22 are provided on a back surface of the clamp 20 (a surface facing the main body 10). The upper clamps 22 face a pair of lower clamps 23 provided on the upper surface of the main body 10 by closing the clamp 20. When the clamp 20 is closed with respect to the main body 10, the bare optical fiber is sandwiched between the pair of upper clamps 22 and the pair of lower clamps 23.

The clamp 20 further includes a spring (not shown) mounted on the spindle 21, a magnet 25 for holding the clamp 20 in a closed state, and a release lever 26 for releasing the closed state of the clamp 20. The spring mounted on the spindle 21 presses the clamp 20 in a direction to open the clamp 20. The magnet 25 is disposed on the side edge of the clamp 20 opposite to the spindle 21. Meanwhile, a catcher 17 is provided on the upper surface of the main body 10 at a position corresponding to the magnet 25. When the clamp 20 is closed with respect to the main body 10, the magnet 25 is attracted to the catcher 17 against pressing force of the spring provided on the spindle 21. Thereby, the closed state of the clamp 20 to the main body 10 is held. By pulling up the release lever 26 in the closed state, force to open the clamp 20 upward is applied to open (release) an attraction between the magnet 25 and the catcher 17. When the attraction between the magnet 25 and the catcher 17 is opened, the clamp 20 is automatically opened by repulsive force of the spring mounted on the spindle 21.

The pillow 40 is mounted on the clamp 20 while a compression spring (not shown) provided between the pillow 40 and the back surface of the clamp 20. The pillow 40 is normally in a protruding state due to a repulsion of the compression spring. That is, the pillow 40 is configured to be held in a state of imparting a bend to the bare optical fiber. A pillow support piece 41 extending downwardly is fixed to the pillow 40. Meanwhile, the slider 16 on which the blade portion 50 is mounted is provided with a projection (not shown) that protrudes upward and abuts against the pillow support piece 41. The projection abuts against the pillow support piece 41 to press the pillow 40 upward against the compression spring. That is, until the blade portion 50 makes an initial scratch on the bare optical fiber, the pillow support piece 41 and the projection of the slider 16 are brought into contact with each other, such that the pillow 40 is pushed back to a non-contact state with the bare optical fiber. Next, when the slider 16 moves backward and the blade portion 50 makes an initial scratch on the bare optical fiber, the projection of the slider 16 passes below the pillow support piece 41, and pressing force of the compression spring causes the pillow 40 to protrude, bend the bare optical fiber, and cleave the bare optical fiber. As such, in conjunction with a sliding operation of the blade portion 50 by the slider 16, an operation of making an initial scratch on the bare optical fiber by the blade portion 50 and a cleave operation of the bare optical fiber by the pillow 40 are automated.

Figure 2:
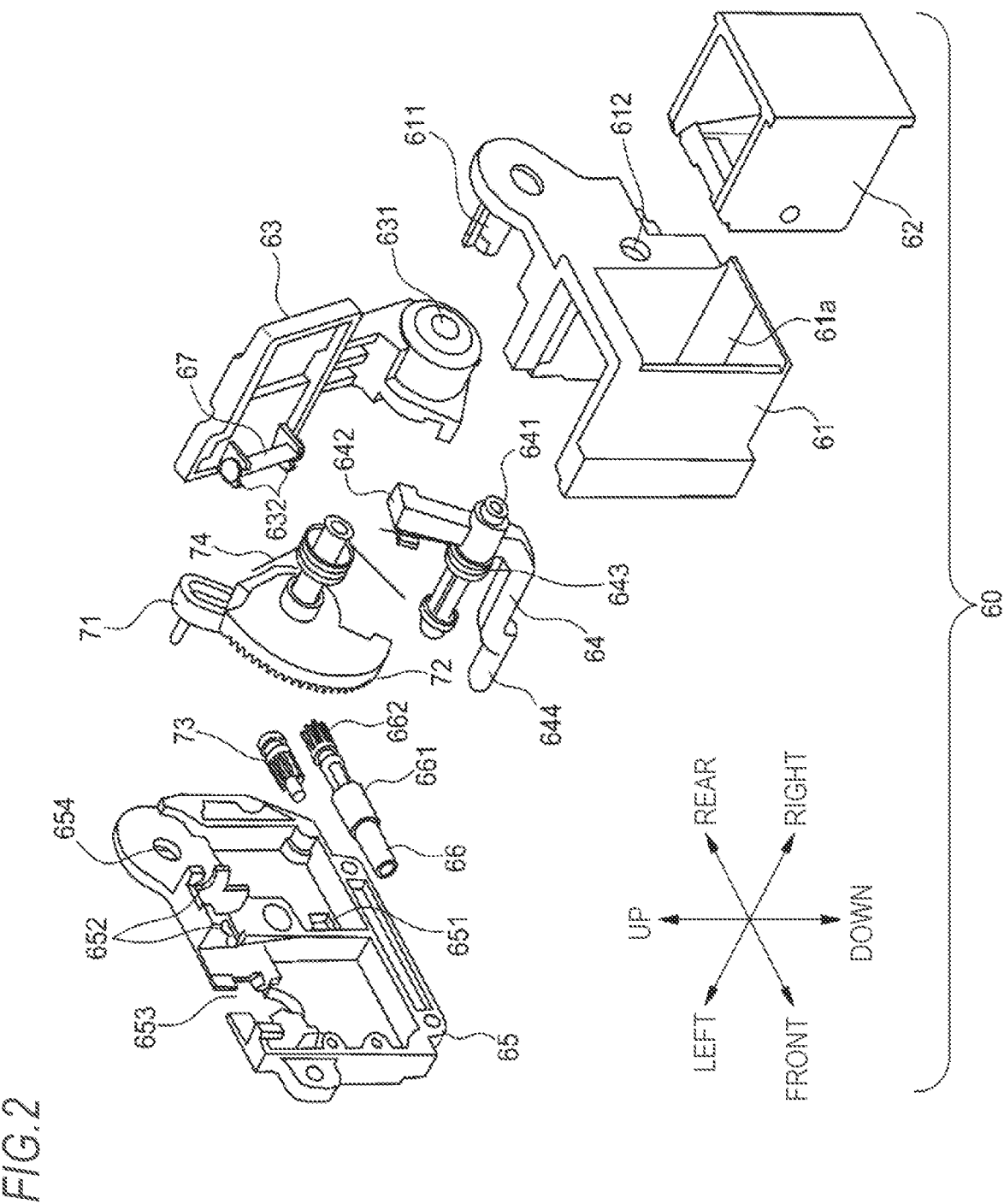
FIG. 2 is an exploded perspective view of a scrap collection mechanism provided in the optical fiber cutter of FIG. 1.

FIG. 2 is an exploded perspective view showing each member constituting the scrap collection mechanism 60.

As shown in FIG. 2, the scrap collection mechanism 60 includes a case main body 61 (an example of a case), an inner case 62 accommodated in the case main body 61, an opening/closing lid 63 openable and closable with respect to an opening at an upper portion of the case main body 61 (an example of a lid portion), and an opening/closing lock lever 64 for locking the opening/closing lid 63 in an open state. The case main body 61 is integrated with the main body 10 by being fixed to a case lid 65 interposed between the main body 10 and the case main body 61. The opening/closing lock lever 64 is rotatable around a shaft 641 with respect to the case main body 61 by attaching the shaft 641 to a bearing 612 of the case main body 61. The opening/closing lid 63 is a plate-shaped body attached to a rear end of an upper surface of the case main body 61. A bearing 631 through which a spindle 611 formed at the rear end of the case main body 61 is inserted is formed at a rear end of the opening/closing lid 63. The opening/closing lid 63 can be freely opened and closed with respect to the case main body 61 by inserting the spindle 611 of the case main body 61 into the bearing 631 of the opening/closing lid 63.

The opening/closing lock lever 64 includes a lock portion 642 extending upward from the shaft 641, a torsion spring (torsion coil spring) 643, and a lever portion 644 bent leftward from below the shaft 641. The torsion spring 643 applies force to the lock portion 642 to rotate around the shaft 641 in one direction. As a result, when the opening/closing lid 63 is closed, a tip end of the lock portion 642 comes into contact with a part of a back surface of the opening/closing lid 63. A tip end of the lever portion 644 is inserted through an opening portion 651 formed in the case lid 65 and protrudes toward the main body 10 side. The lever portion 644 protruding toward the main body 10 is pressed by the sliding operation of the slider 16 and gives the opening/closing lock lever 64 force to rotate in the opposite direction around the shaft 641 against biasing force of the torsion spring 643.

The scrap collection mechanism 60 further includes a lower roller 66 (an example of a rotating roller) pivotally supported within the case main body 61, and an upper roller 67 pivotally supported on the back surface of the opening/closing lid 63. The lower roller 66 is a single substantially cylindrical member made of a resin molded product, and is provided with a feed-out portion 661 near the center thereof with which scraps of bare optical fibers come into contact, and a gear 662 (an example of a second gear) at a rear end thereof. The lower roller 66 is rotatably attached to a plurality of lower roller holding portions 652 provided on the case lid 65. A notch 653 is formed in the case lid 65 such that the feed-out portion 661 is exposed from the main body 10 side while the lower roller 66 is attached to the lower roller holding portion 652. The upper roller 67 is rotatably attached to an upper roller holding portion 632 provided on the back surface of the opening/closing lid 63. When the opening/closing lid 63 is closed, scraps of the bare optical fiber are sandwiched between the upper roller 67 and the feed-out portion 661 of the lower roller 66. By rotating the lower roller 66, the scraps are sent in the direction away from the clamp 20, and the scraps are charged into the inner case 62. As a result, the inner case 62 accommodating the scraps can be removed from the case main body 61 and discarded easily and reliably. One side surface 61a of the case main body 61 is open as an outlet for the inner case 62.

The scrap collection mechanism 60 further includes a drive lever 71 (an example of a driving unit) accommodated in the case main body 61, a drive gear 72 (an example of a driving unit and a first gear) mounted on the drive lever 71, and an idle gear 73 interposed between the drive gear 72 and the lower roller 66.

Figure 3A:
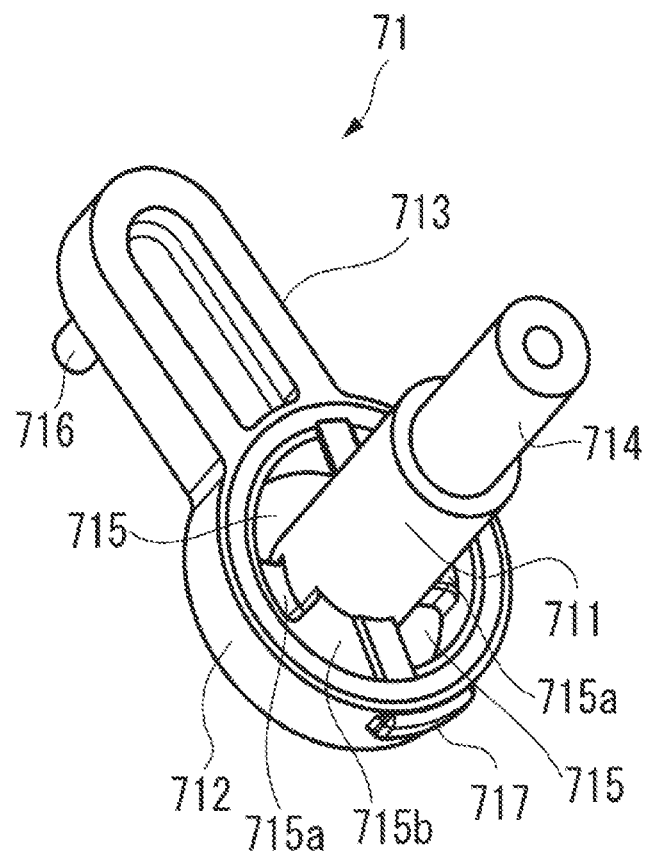
FIG. 3A is a perspective view of a drive lever provided in the scrap collection mechanism of FIG. 2.

FIGS. 3A and 3B are perspective views of the drive lever 71.

As shown in FIGS. 3A and 3B, the drive lever 71 includes a shaft 711, a flange 712 provided at a left end of the shaft 711, and an arm portion 713 protruding upward from the flange 712. The shaft 711 is inserted through an opening portion 721a provided in the drive gear 72, which will be described later. A small shaft 714 having a smaller diameter than the shaft 711 is formed further on the right side from a right end of the shaft 711. The small shaft 714 is inserted through the bearing 631 of the opening/closing lid 63. As described above, the spindle 611 formed in the case main body 61 is inserted through the bearing 631 from a direction opposite to the insertion direction of the small shaft 714. A torsion spring 74 is mounted around the small shaft 714 as shown in FIG. 2. The torsion spring 74 is configured to apply force in the closing direction to the opening/closing lid 63 according to the rotation operation of the drive gear 72, which will be described later.

In the drive lever 71, a pair of opening portions 715 through which a pair of claw portions 722 of the drive gear 72, which will be described later, can be inserted is formed on an inner periphery of the flange 712 provided on an outer periphery of the shaft 711. A stepped portion 715a is provided at one end of each opening portion 715. The stepped portion 715a is a step portion provided between an inner peripheral surface 715b of the flange 712 and the opening portion 715, on a right side surface of the flange 712 in the direction in which the claw portion 722 is inserted through the opening portion 715. An attachment portion 716 that protrudes leftward is provided at the upper portion of the arm portion 713. The attachment portion 716 is attached to a right side surface of the clamp 20. The attachment portion 716 extends in a direction substantially parallel to the shaft 711 of the drive lever 71. The attachment portion 716 is attached to the clamp 20 such that an extending direction (longitudinal direction) of the attachment portion 716 is substantially parallel to the spindle 21 of the clamp 20. As a result, the drive lever 71 rotates around the shaft 711 substantially parallel to the spindle 21 of the clamp 20 in conjunction with the opening/closing operation of the clamp 20. A projection 717 having a predetermined length is provided on an outer periphery of the flange 712 on a side (lower side) opposite to a side (upper side) on which the arm portion 713 is provided.

Figure 4A:
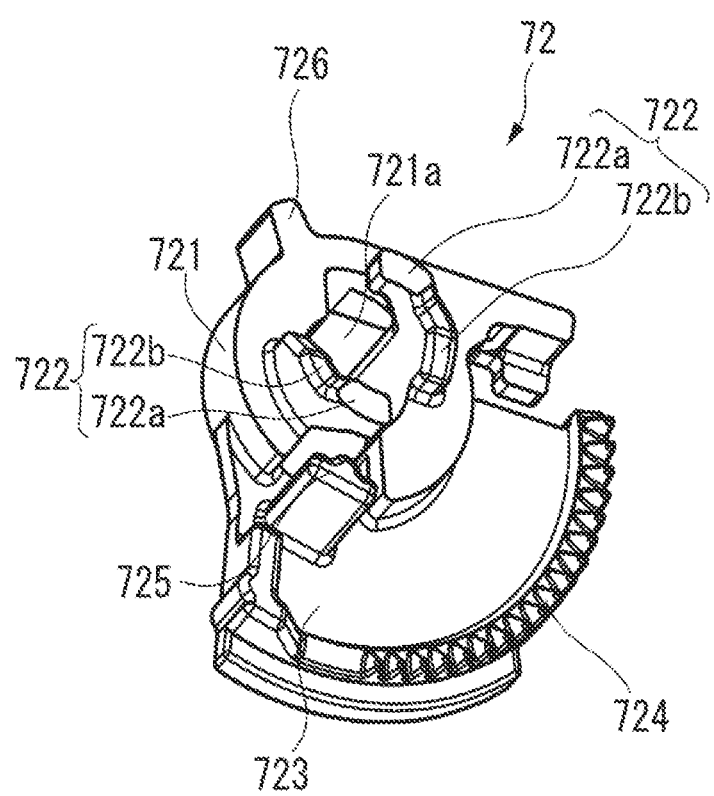
FIG. 4A is a perspective view of a drive gear provided in the scrap collection mechanism of FIG. 2.
Figure 4B:
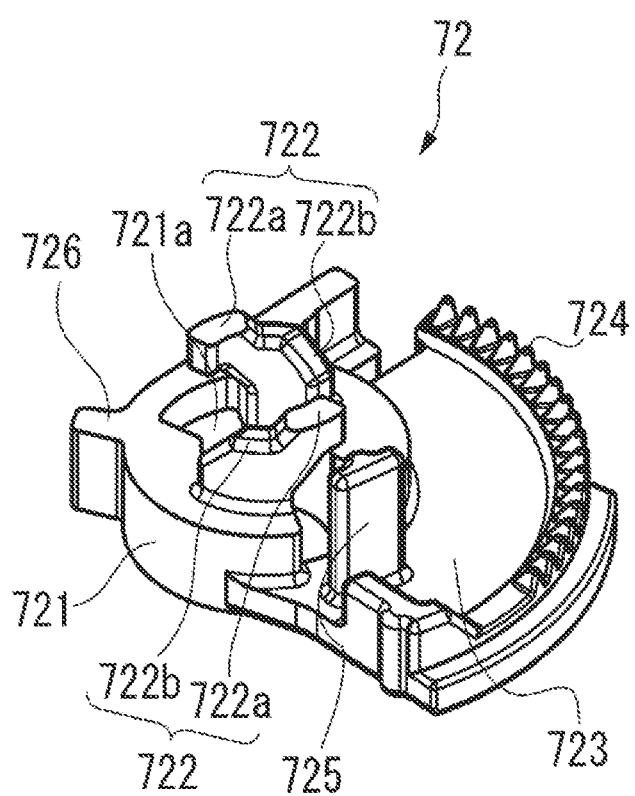
FIG. 4B is a perspective view of the drive gear provided in the scrap collection mechanism of FIG. 2.

FIGS. 4A and 4B are perspective views of the drive gear 72.

As shown in FIGS. 4A and 4B, the drive gear 72 includes a substantially cylindrical base portion 721, a pair of claw portions 722, a gear mounting portion 723, a gear portion 724, a peak portion 725, and a projection 726. The pair of claw portions 722 are inserted through the pair of opening portions 715 of the drive lever 71. The pair of claw portions 722 are provided on a left side surface of the base portion 721 to protrude leftward stepwisely. That is, each claw portion 722 includes a tip 722a and a step portion 722b. The tip 722a is inserted into each opening portion 715 at all times. On the other hand, the position of the step portion 722b changes between a state being inserted into each opening portion 715 and a state of being in contact with the stepped portion 715a without being inserted into each opening portion 715 according to the rotation of the drive lever 71. With such configuration, separation and approach between the right side surface of the flange 712 and the left side surface of the base portion 721 can be controlled.

The gear mounting portion 723 extends in a fan shape from a part of an outer periphery of the base portion 721. A plurality of gear portions 724 are formed on an outer edge of the fan-shaped gear mounting portion 723 to protrude leftward. The peak portion 725 protrudes leftward from the gear mounting portion 723 in a vicinity of one of the pair of claw portions 722. The projection 726 is formed to protrude from the outer periphery of the base portion 721 on the side opposite to a side on which the gear mounting portion 723 extends. The opening portion 721a through which the shaft 711 of the drive lever 71 is inserted is formed between the pair of claw portions 722 to penetrate the base portion 721.

(Optical Fiber Cleave Operation)

Next, the operation of the optical fiber cutter 1 as described above will be described. The operation of the scrap collection mechanism 60 will be described later.

First, an optical fiber is set in an optical fiber holder (not shown), and the coating at the end portion of the optical fiber is stripped to expose the bare optical fiber. The optical fiber holder is fitted into the holder guide 14 by opening the clamp 20.

Next, the clamp 20 is closed against repulsive force of the pillow 40 to attract the magnet 25 to the catcher 17. Here, the bare optical fiber is sandwiched between the upper and lower clamps 22 and 23. The pillow support piece 41 abuts against the projection of the slider 16, and the pillow 40 is held in a pushed back state.

Next, the slider 16 is slid to bring the blade portion 50 into contact with the bare optical fiber to make an initial scratch. When making an initial scratch on the bare optical fiber, the projection of the slider 16 passes under the pillow support piece 41, and the pillow 40 returns to the protruding state to bend the bare optical fiber. Here, since a tip end side and a root side of the bare optical fiber are held by the upper and lower clamps 22 and 23, tension is applied to the bare optical fiber. As a result, the initial scratch progresses and the bare optical fiber breaks.

Then, the clamp 20 is opened. The opening operation is performed by pulling up the release lever 26 and forcing the clamp 20 to open. Since a torsion spring that presses the lid portion in the direction to open the clamp 20 is mounted on the spindle 21 of the clamp 20, the clamp 20 is automatically opened by repulsive force, and the upper and lower clamps 22 and 23 are also opened.

After cleaving, the optical fiber is taken out from the optical fiber holder fitted in the holder guide 14.

(Automatic Opening/Closing Operation of Opening/Closing Lid 63)

Figure 5A:
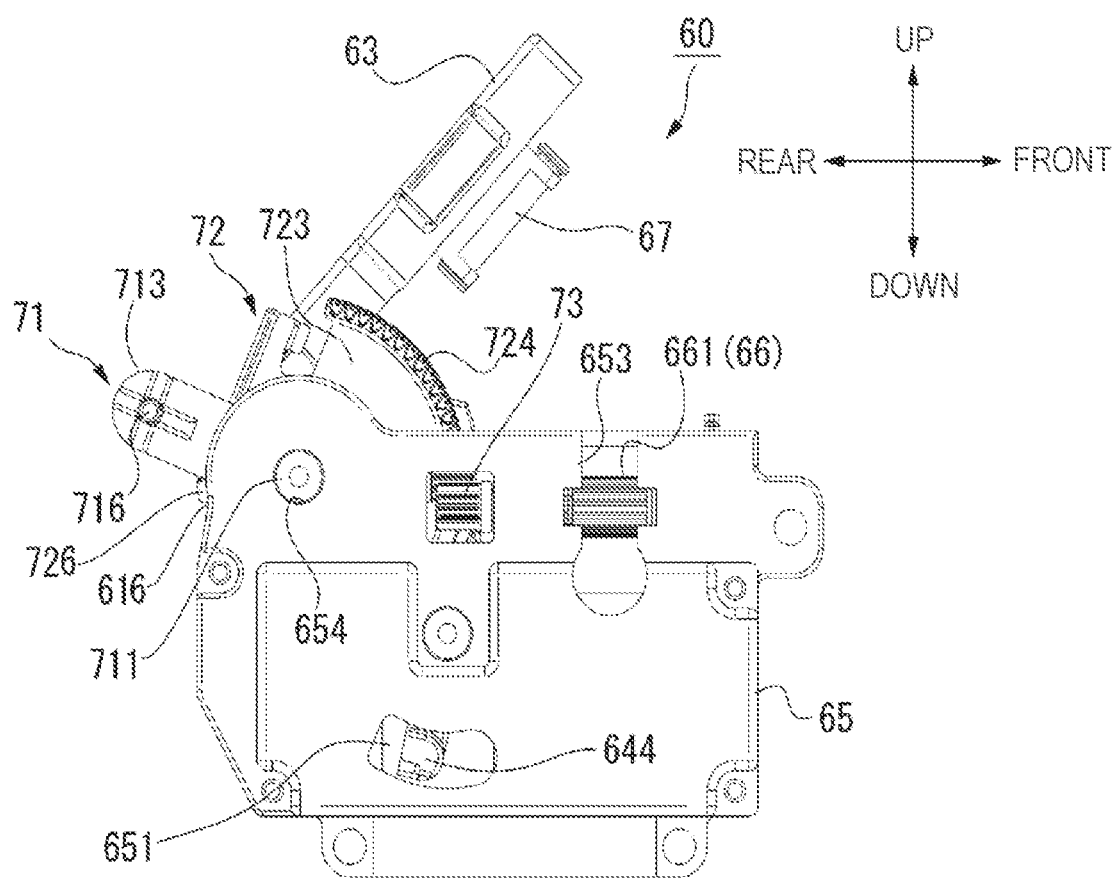
FIG. 5A is a left side view of the scrap collection mechanism in an initial state (first state).
Figure 6:
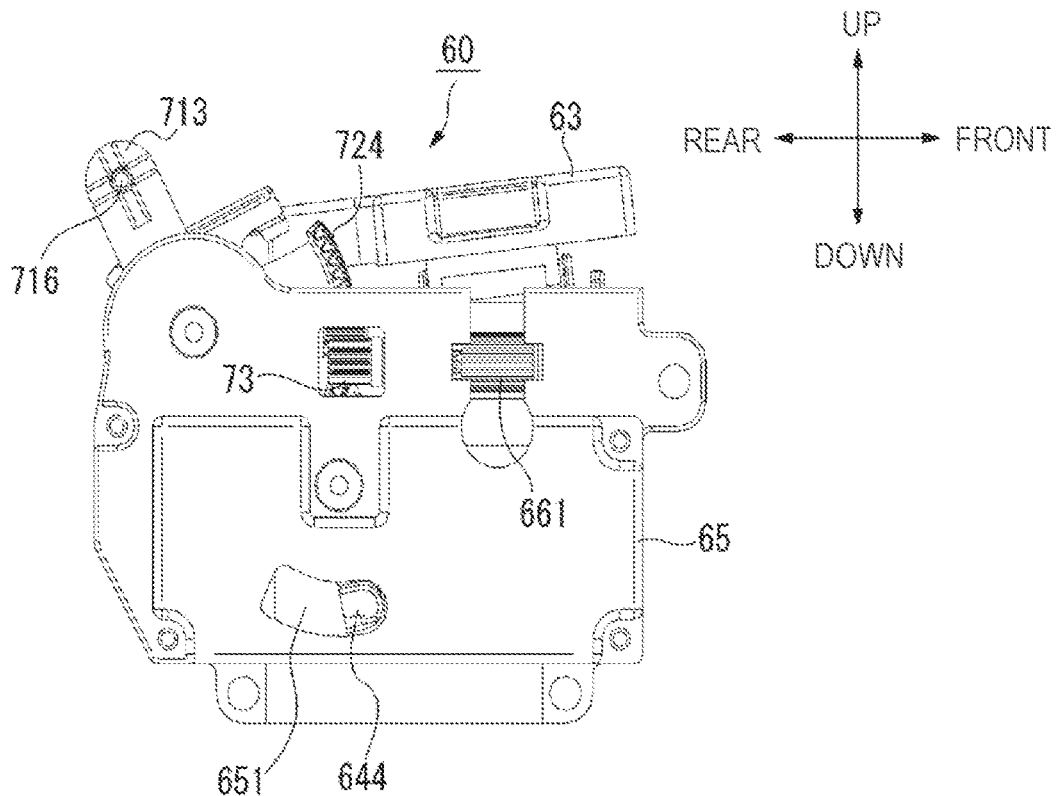
FIG. 6 is a left side view of the scrap collection mechanism in a second state.
Figure 7:
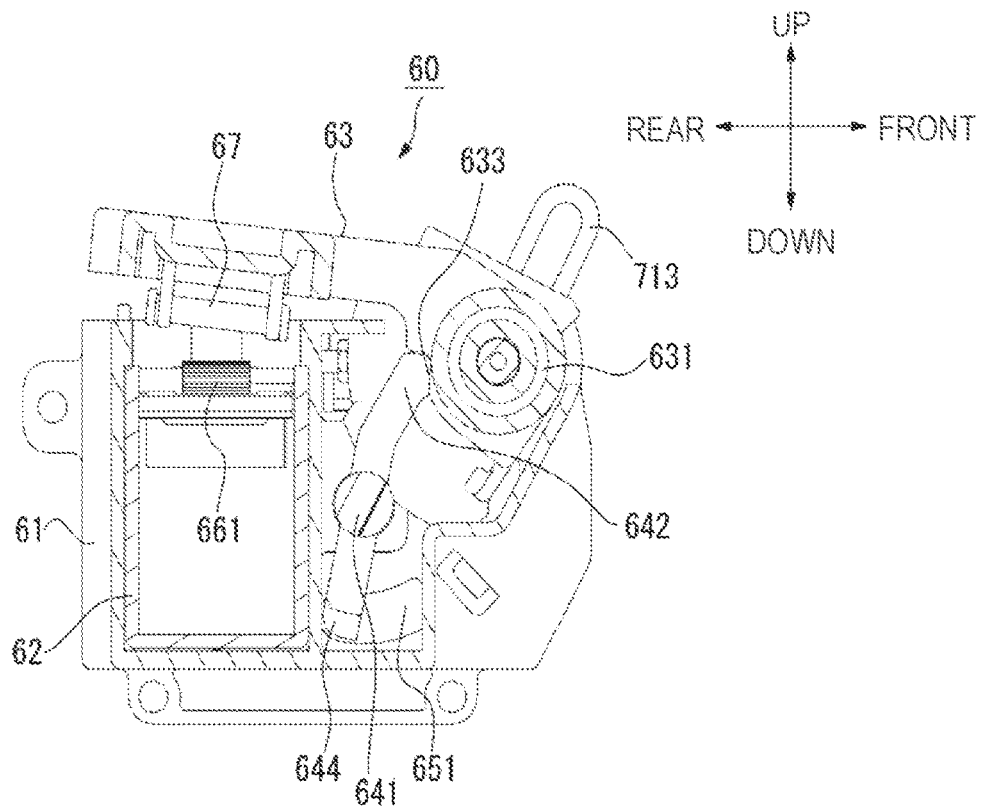
FIG. 7 is a cross-sectional view taken along a line A-A of the scrap collection mechanism in the second state.
Figure 8:
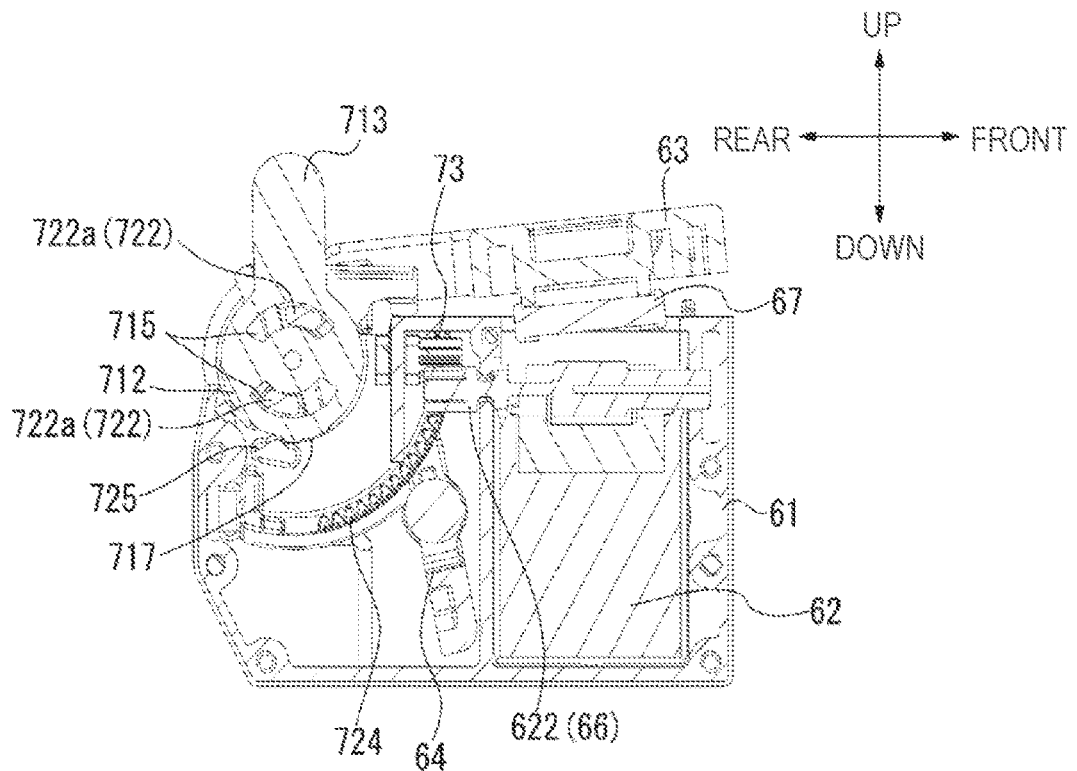
FIG. 8 is a cross-sectional view taken along a line B-B of the scrap collection mechanism in a third state.
Figure 9:
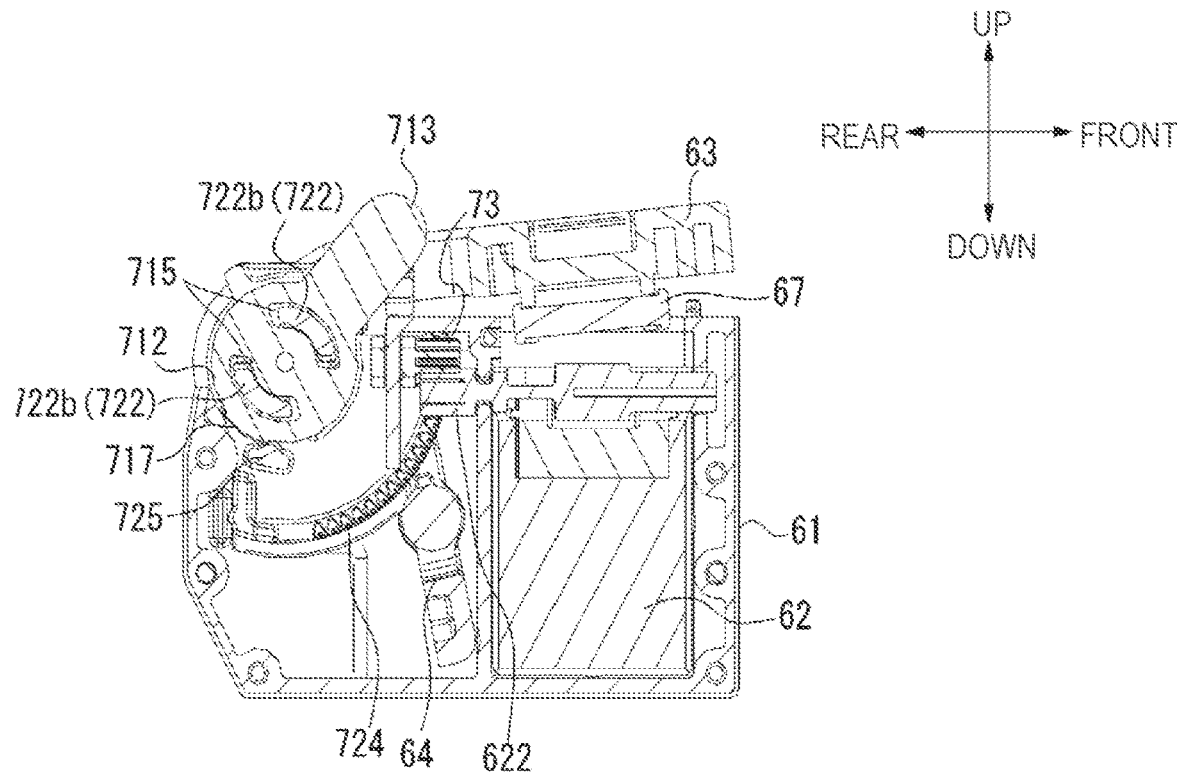
FIG. 9 is a cross-sectional view taken along the line B-B of the scrap collection mechanism in a fourth state.
Figure 10:
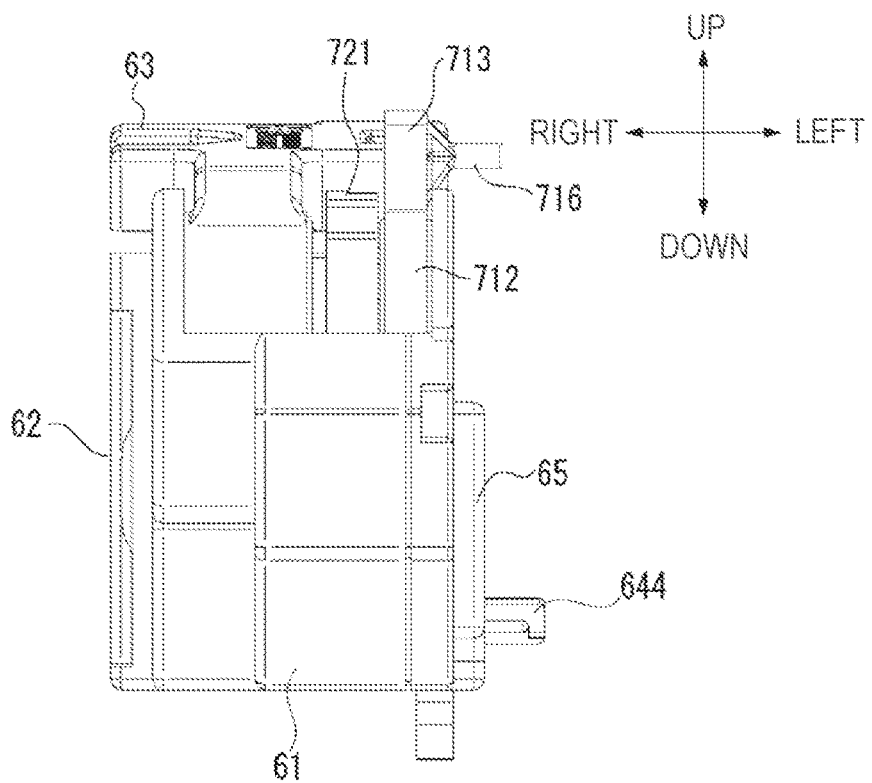
FIG. 10 is a rear view of the scrap collection mechanism in the fourth state.
Figure 11:
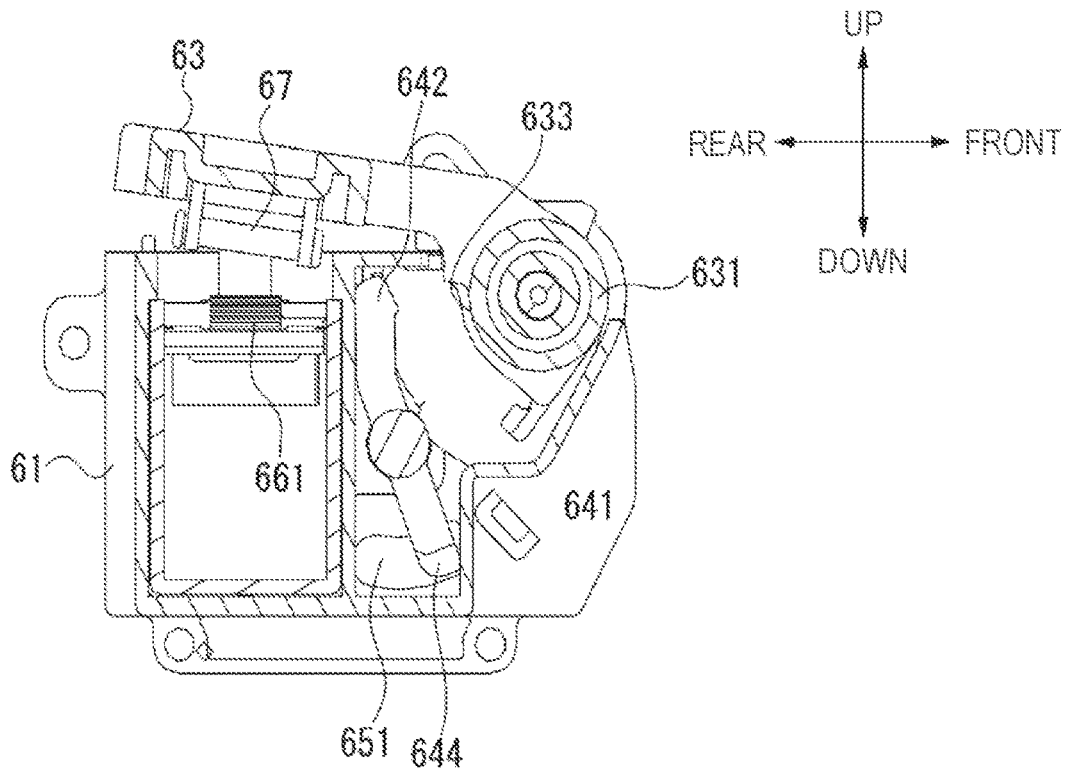
FIG. 11 is a cross-sectional view taken along the line A-A of the scrap collection mechanism in a fifth state.
Figure 12:
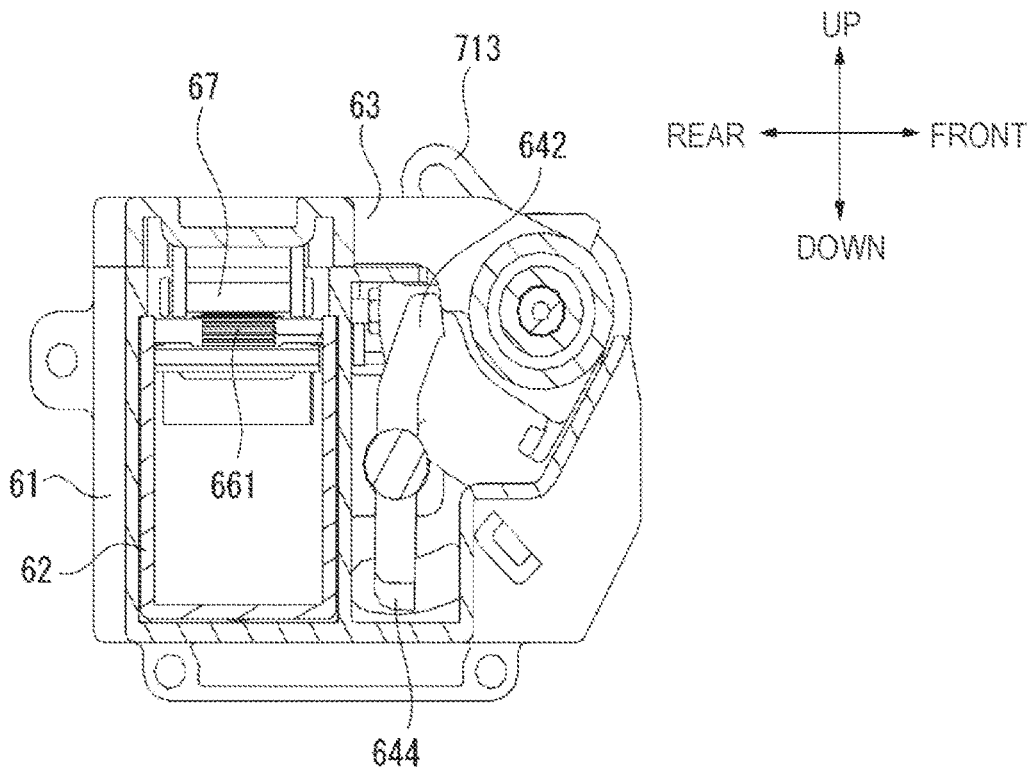
FIG. 12 is a cross-sectional view taken along the line A-A of the scrap collection mechanism in a sixth state.
Figure 13:
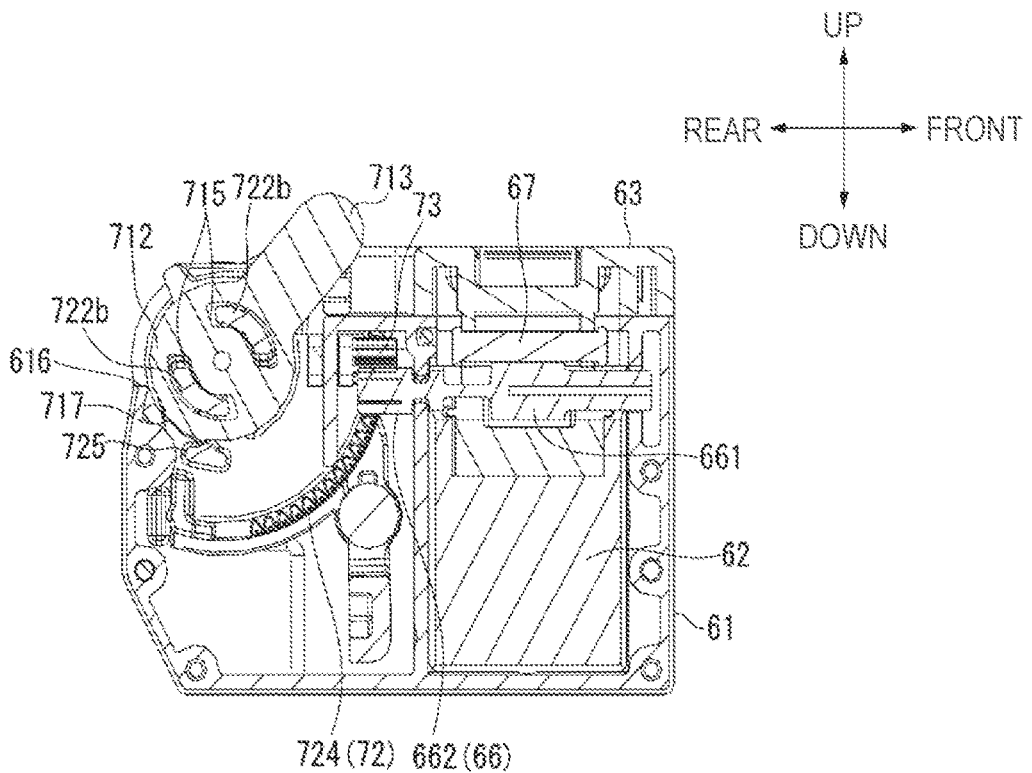
FIG. 13 is a cross-sectional view taken along the line B-B of the scrap collection mechanism in the sixth state.
Figure 14:
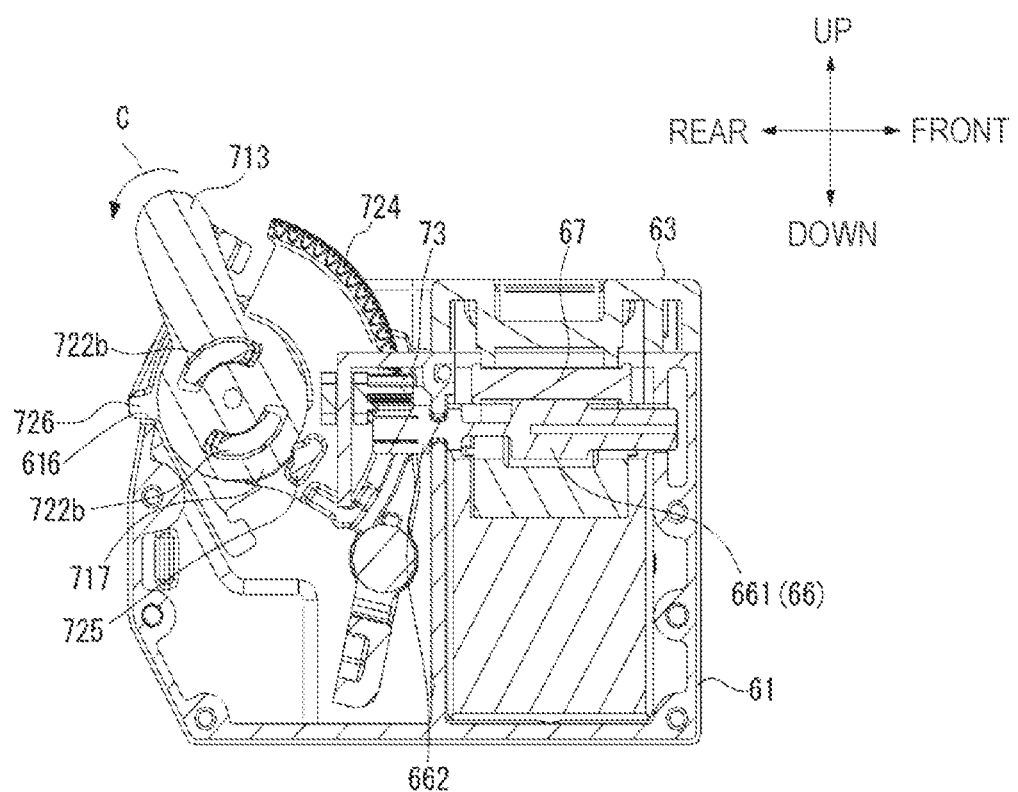
FIG. 14 is a cross-sectional view taken along the line B-B of the scrap collection mechanism in a seventh state.
Figure 15:
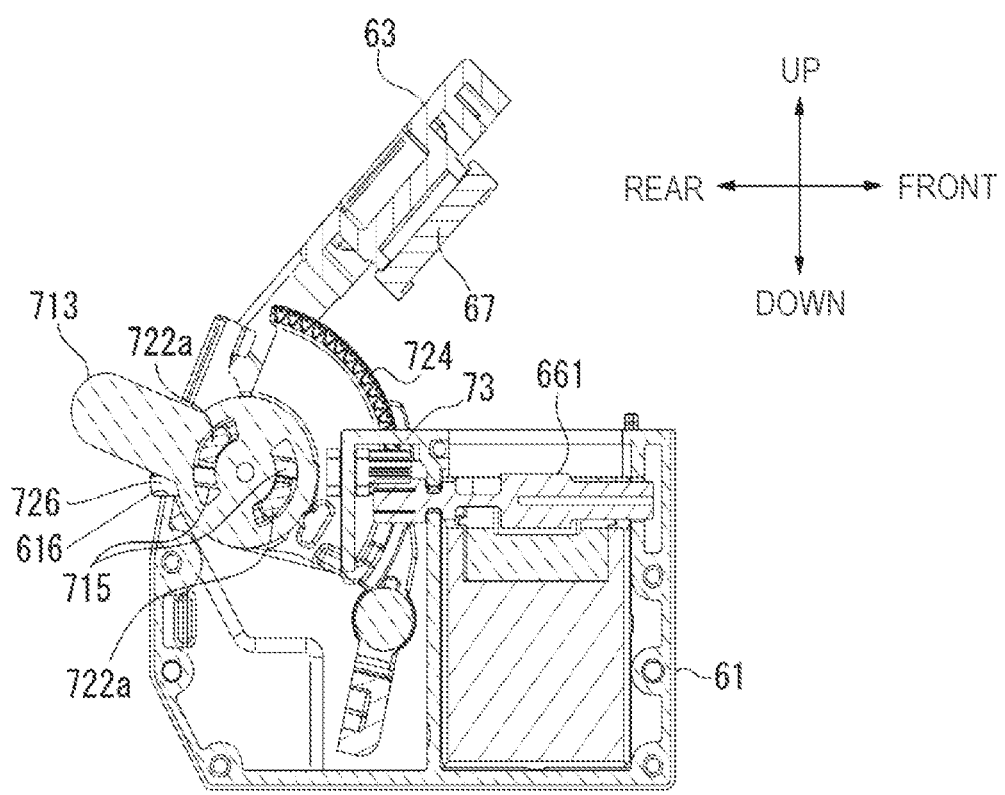
FIG. 15 is a cross-sectional view taken along the line B-B of the scrap collection mechanism in an eighth state (a state returned to the initial state).

Next, with reference to FIGS. 5A to 15, the automatic opening/closing operation of the opening/closing lid 63 provided in the scrap collection mechanism 60, which is executed in conjunction with the opening/closing operation of the clamp 20 of the optical fiber cutter 1 as described above, will be described. FIG. 5A is a left side view of the scrap collection mechanism in an initial state (first state). FIG. 5B is a rear view of the scrap collection mechanism in the initial state. FIG. 6 is a left side view of the scrap collection mechanism in a second state. FIG. 7 is a cross-sectional view taken along a line A-A of the scrap collection mechanism in the second state. FIG. 8 is a cross-sectional view taken along a line B-B of the scrap collection mechanism in a third state. FIG. 9 is a cross-sectional view taken along the line B-B of the scrap collection mechanism in a fourth state. FIG. 10 is a rear view of the scrap collection mechanism in the fourth state. FIG. 11 is a cross-sectional view taken along the line A-A of the scrap collection mechanism in a fifth state. FIG. 12 is a cross-sectional view taken along the line A-A of the scrap collection mechanism in a sixth state. FIG. 13 is a cross-sectional view taken along the line B-B of the scrap collection mechanism in the sixth state. FIG. 14 is a cross-sectional view taken along the line B-B of the scrap collection mechanism in a seventh state. FIG. 15 is a cross-sectional view taken along the line B-B of the scrap collection mechanism in an eighth state (initial state).

As shown in FIG. 5A, in the initial state where the clamp 20 is completely opened with respect to the main body 10, the drive lever 71 of the scrap collection mechanism 60 is held while the arm portion 713 is tilted rearward by the attachment portion 716 attached to the right side surface of the clamp 20. Here, forward force is applied to the lever portion 644 of the opening/closing lock lever 64 by the torsion spring 643 attached to the shaft 641. As a result, the lever portion 644 is in a state of being at the forwardmost position within the opening portion 651 of the case lid 65. The lock portion 642 provided on an opposite side of the lever portion 644 with the shaft 641 sandwiched therebetween comes into contact with an outer peripheral surface of the bearing 631 of the opening/closing lid 63, and accordingly, the opening/closing lid 63 is held in a state of being open with respect to the case main body 61.

As shown in FIG. 5B, the drive gear 72 is inserted through the shaft 711 of the drive lever 71 and sandwiched between the flange 712 of the drive lever 71 and the bearing 631 of the opening/closing lid 63. In the initial state shown in FIGS. 5A and 5B, the projection 726 of the drive gear 72 is in contact with the upper edge 616 on a back surface side of the case main body 61, and thus only the tip 722a of each claw portion 722 of the drive gear 72 is inserted into each opening portion 715 of the drive lever 71, and the step portion 722b of each claw portion 722 is in contact with the stepped portion 715a of the drive lever 71. Accordingly, as shown in FIG. 5B, the left side surface of the base portion 721 of the drive gear 72 and the right side surface of the flange 712 of the drive lever 71 does not come into contact with each other, and the base portion 721 and the flange 712 are separated by a certain distance. Thus, in the initial state where the base portion 721 and the flange 712 are separated, even when the gear portion 724 of the drive gear 72 is not engaged with the idle gear 73 and the drive gear 72 is rotated by the drive lever 71, the rotation operation of the drive gear 72 is not transmitted to the lower roller 66 via the idle gear 73.

Next, as the second state, when the closing operation of the clamp 20 with respect to the main body 10 is started, as shown in FIG. 6, the arm portion 713 including the attachment portion 716 moves in conjunction with the closing operation of the clamp 20, and accordingly, the drive lever 71 rotates in the clockwise direction in FIG. 6. The drive gear 72 also rotates clockwise in conjunction with the rotation operation of the drive lever 71. Here, biasing force of the torsion spring 74 that rotates together with the drive gear 72 applies force to the opening/closing lid 63 in the direction of being closed with respect to the case main body 61.

As shown in FIG. 7, when the opening/closing lid 63 moves in the closing direction with respect to the case main body 61, the lock portion 642 of the opening/closing lock lever 64 comes into contact with a step 633 formed on the back surface of the opening/closing lid 63. The lock portion 642 is pressed rearward by the biasing force of the torsion spring 643. As a result, the opening/closing lid 63 is not completely closed with respect to the case main body 61, and the upper surface of the case main body 61 and the back surface of the opening/closing lid 63 are separated by a predetermined distance. That is, in the second state, the upper roller 67 and the feed-out portion 661 of the lower roller 66 does not come into contact with each other, and thus the optical fiber is not sandwiched between the upper roller 67 and the feed-out portion 661.

Subsequently, as the third state, when the clamp 20 moves in the direction in which the clamp 20 is further closed with respect to the main body 10 than in the second state, as shown in FIG. 8, the arm portion 713 further moves in conjunction with the closing operation of the clamp 20, and accordingly, the drive lever 71 further rotates in the clockwise direction in FIG. 8. Note that from the initial state to the third state, a state where only the tips 722a of the pair of claw portions 722 of the drive gear 72 are inserted into the pair of opening portions 715 of the drive lever 71 is achieved, and the step portion 722b is not inserted into the opening portion 715. That is, until the third state, the base portion 721 and the flange 712 are separated from each other, and thus the gear portion 724 of the drive gear 72 is not engaged with the idle gear 73. Therefore, as described above, even when the drive gear 72 is rotated by the drive lever 71 from the initial state to the third state, the rotation operation of the drive gear 72 is not transmitted to the lower roller 66 via the idle gear 73, and the lower roller 66 is not rotated.

The projection 717 formed at a part of the outer periphery of the flange 712 of the drive lever 71 is in contact with the peak portion 725 of the drive gear 72. Specifically, a stage portion on a rear side of the projection 717 is in contact with a stage portion on a front side of the peak portion 725.

Subsequently, as the fourth state, when the clamp 20 is completely closed with respect to the main body 10, as shown in FIG. 9, the arm portion 713 further moves in conjunction with the closing operation of the clamp 20, and accordingly, the drive lever 71 further rotates in the clockwise direction in FIG. 9. Further rotation of the drive lever 71 causes the projection 717 to cross over the peak portion 725 of the drive gear 72. Specifically, a stage portion on a front side of the projection 717 is in contact with a stage portion on a rear side of the peak portion 725. Thus, in the fourth state, the pair of claw portions 722 (tip 722a and step portion 722b) of the drive gear 72 are entirely inserted into the pair of opening portions 715 of the drive lever 71. Here, as shown in FIG. 10, the left side surface of the base portion 721 of the drive gear 72 and the right side surface of the flange 712 of the drive lever 71 are brought into contact with each other. As a result, the gear portion 724 of the drive gear 72 is engaged with the idle gear 73.

Subsequently, as the fifth state, the slider 16 including the blade portion 50 is moved rearward to make an initial scratch on the optical fiber. Here, as shown in FIG. 11, the slider 16 moves rearward, the lever portion 644 of the opening/closing lock lever 64 comes into contact with a step (not shown) of the slider 16, and the lever portion 644 is moved rearward within the opening portion 651 of the case lid 65. As a result, the lock portion 642 provided on the opposite side of the lever portion 644 with the shaft 641 sandwiched therebetween is moved forward. Due to the forward movement of the lock portion 642, the contact between the step 633 on the back surface of the opening/closing lid 63 and the lock portion 642 is released, and the opening/closing lid 63 moves in the direction of being closed with respect to the case main body 61. As described above, the opening/closing lid 63 is applied with force in the closing direction by the torsion spring 74 interlocked with the rotation operation of the drive gear 72. As a result, the opening/closing lid 63 comes into contact with the upper surface of the case main body 61, and the opening/closing lid 63 is completely closed with respect to the case main body 61.

Subsequently, in the sixth state, when the opening/closing lid 63 is completely closed against the upper surface of the case main body 61, as shown in FIGS. 12 and 13, the feed-out portion 661 of the lower roller 66 and the upper roller 67 come into contact with each other, and the optical fiber is held between the feed-out portion 661 and the upper roller 67. After the optical fiber is initially scratched by the sliding movement of the blade portion 50, the projection of the slider 16 passes under the pillow support piece 41 as described above, and the pillow 40 returns to the protruding state, bending is imparted to the bare optical fiber, the initial scratch progresses, and the bare optical fiber breaks. As such, the optical fiber held between the feed-out portion 661 and the upper roller 67 becomes scraps.

In the seventh state, when the clamp 20 is opened with respect to the main body 10 after the optical fiber is broken, as shown in FIG. 14, in conjunction with the opening operation of the clamp 20, the arm portion 713 of the drive lever 71 also rotates counterclockwise in FIG. 14. Here, since the pair of claw portions 722 of the drive gear 72 are substantially entirely inserted into the pair of opening portions 715 of the drive lever 71, the left side surface of the base portion 721 of the drive gear 72 and the right side surface of the flange 712 of the drive lever 71 come into contact with each other, and the gear portion 724 of the drive gear 72 is engaged with the idle gear 73. Here, when the arm portion 713 rotates counterclockwise, the gear portion 724 of the drive gear 72 also rotates counterclockwise. As a result, the idle gear 73 engaged with the gear portion 724 rotates around the axis thereof, and further, the gear 662 engaged with the idle gear 73 rotates the lower roller 66. In the seventh state, the feed-out portion 661 of the lower roller 66 and the upper roller 67 are in contact with each other, and the state where scraps are held between the feed-out portion 661 and the upper roller 67 is maintained. Therefore, the scraps sandwiched between the upper roller 67 and the feed-out portion 661 of the lower roller 66 are fed in the direction away from the clamp 20 as the lower roller 66 rotates. The fed scraps fall and are stored in the inner case 62.

Subsequently, as the eighth state, when the clamp 20 is further opened from the main body 10, the drive lever 71 is also further rotated in the direction of arrow C shown in FIG. 14. As a result, force to rotate in the arrow C direction is applied to the drive gear 72 as well. However, the projection 726 of the drive gear 72 comes into contact with the upper edge 616 of the case main body 61, and accordingly, the rotation of the drive gear 72 is restricted at the current position. As a result, the step portions 722b of the pair of claw portions 722 that were inserted into the pair of opening portions 715 of the drive lever 71 are pushed out from the inside of the opening portions 715 and come into contact with the stepped portion 715a formed on the flange 712. That is, as shown in FIG. 15, when the drive lever 71 returns to the position of the initial state (eighth state) in conjunction with the opening operation of the clamp 20, only the tips 722a of the pair of claw portions 722 are inserted into the pair of opening portions 715 of the drive lever 71. Therefore, the right side surface of the flange 712 of the drive lever 71 and the left side surface of the base portion 721 of the drive gear 72 are again separated by a certain distance (FIG. 5B), and the engagement between the gear portion 724 and the idle gear 73 is released. Here, the peak portion 725 of the drive gear 72 returns to the state of being in contact with the stage portion on the rear side of the projection 717.

As such, a movable range of the drive lever 71 interlocked with the opening/closing operation of the clamp 20 is made larger than a movable range of the drive gear 72, thereby changing a positional relationship between the drive lever 71 and the drive gear 72. A configuration is implemented in which the gear portion 724 of the drive gear 72 and the idle gear 73 are engaged with each other only at desired timing.

As described above, the optical fiber cutter 1 according to the present embodiment includes at least the openable and closable clamp 20 (22, 23) that holds an optical fiber, and the movable blade portion 50 that scratches the optical fiber held by the clamp 20. The optical fiber cutter 1 further includes the scrap collection mechanism 60 for collecting scraps of the cleaved optical fiber. The scrap collection mechanism 60 includes the case main body 61 (an example of a case) in which scraps are accommodated, and the opening/closing lid 63 (an example of a lid portion) that opens and closes with respect to the case main body 61 in conjunction with the opening/closing operation of the clamp 20. As such, the opening/closing lid 63 automatically opens and closes in conjunction with the opening/closing operation of the clamp 20, and thus the work efficiency in the cleave work of the optical fiber and the scrap collection work is improved.

The scrap collection mechanism 60 further includes the lower roller 66 (an example of a rotating roller) that is provided in the case main body 61 for holding and feeding out the scraps in the direction away from the clamp 20, and the drive lever 71 and the drive gear 72 (an example of a driving unit) that transmit the opening operation of the clamp 20 to the opening/closing lid 63 and the lower roller 66. As described above, the scrap collection mechanism 60 is provided with the drive lever 71 and the drive gear 72 as mechanisms for transmitting the operation of the clamp to both the opening/closing lid 63 and the lower roller 66, and thus the optical fiber cutter 1 with significantly improved workability can be provided with a small number of parts.

The drive lever 71 and the drive gear 72 provided in the scrap collection mechanism 60 are configured to transmit the closing operation of the clamp 20 to the opening/closing lid 63 and not to the lower roller 66. Specifically, the drive lever 71 interlocks with the opening/closing operation of the clamp 20, and the drive gear 72 (an example of a first gear) rotates according to the operation of the drive lever 71. The lower roller 66 integrally includes the gear 662 (an example of a second gear) at one end thereof. While the drive gear 72 moves toward the gear 662 and is directly or indirectly engaged with the gear 662 according to the operation of the drive lever 71 interlocked with the opening operation of the clamp 20, the drive gear 72 moves to the side opposite to the gear 662 and releases the direct or indirect engagement with the gear 662 according to the operation of the drive lever 71 interlocked with the closing operation of the clamp 20. With such configuration, the lower roller 66 is not rotated when the clamp 20 is closed. That is, the lower roller 66 is only rotated to send the scraps in the direction away from the clamp 20. As a result, for example, even when scraps adhere to the lower roller 66, it is possible to prevent the scraps from being pulled back toward the clamp 20 when the opening/closing lid 63 is closed together with the clamp 20. As such, according to the present example, a configuration in which the lower roller 66 rotates only in the direction away from the clamp 20 can be implemented simply and with a small number of parts.

In the present embodiment, the clamp 20 and the opening/closing lid 63 of the scrap collection mechanism 60 are configured to open and close by rotating around rotation axes parallel to each other. That is, the spindle 21 that is the opening/closing shaft of the clamp 20 and the shaft 711 of the drive lever 71 that is the opening/closing shaft of the opening/closing lid 63 are substantially parallel. According to such configuration, the interlocking mechanism between the clamp 20 and the opening/closing lid 63 can be implemented with a simple configuration.

While the present disclosure has been described in detail and with reference to specific embodiments, it will be apparent to those skilled in the art that various changes or modifications can be made without departing from the spirit and scope of the present disclosure. The number, positions, shapes, and the like of the constituent members described above are not limited to those in the above embodiment, and can be changed to suitable numbers, positions, shapes, and the like in carrying out the present disclosure.

In the scrap collection mechanism 60 in the above embodiment, the rotation direction of the lower roller 66 interlocked with the opening/closing operation of the opening/closing lid 63 is restricted to one direction, and thus a mechanism as the driving unit that drives the rotation operation of the opening/closing lid 63 and the lower roller 66 is composed of two parts such as the drive lever 71 and the drive gear 72. However, the present disclosure is not limited thereto. When it is not necessary to restrict the rotation direction of the lower roller 66 to one direction, the driving unit may be configured as a single part in which the drive lever 71 and the drive gear 72 are integrated. Accordingly, it is possible to further reduce the number of parts. Although the above optical fiber cutter was described as an example of cleaving an optical fiber, the same applies to the case of arranging a plurality of optical fibers in parallel.

REFERENCE SIGNS LIST

1 Optical fiber cutter
10 Main body
11 Upper main body
12 Lower main body
13 Connecting piece
14 Holder guide
15 Exposure hole
16 Slider
17 Catcher
20 Clamp
21 Spindle
22 Upper clamp
23 Lower clamp
25 Magnet
26 Release lever
40 Pillow
41 Pillow support piece
50 Blade portion
60 Scrap collection mechanism
61 Case main body
62 Inner case
63 Opening/closing lid (example of lid portion)

64 Opening/closing lock lever
65 Case lid
66 Lower roller (example of rotating roller)
67 Upper roller
71 Drive lever (example of driving unit)
72 Drive gear (example of driving unit and first gear)
73 Idle gear
74 Torsion spring
611 Spindle
612 Bearing
631 Bearing
632 Upper roller holding portion
641 Shaft
642 Lock portion
643 Torsion spring
644 Lever portion
651 Opening portion
652 Lower roller holding portion
661 Feed-out portion
662 Gear (example of second gear)
711 Shaft
712 Flange
713 Arm portion
714 Small shaft
715 Opening portion
715a Stepped portion
715b Inner peripheral surface (of flange)
716 Attachment portion
717 Projection
721 Base portion
721a Opening portion
722 Claw portion
722a Tip end portion (of claw portion)
722b Step portion (of claw portion)
723 Gear mounting portion
724 Gear portion
725 Peak portion
726 Projection

What is claimed is:

1. An optical fiber cutter that cleaves a part of an optical fiber, the optical fiber cutter comprising:
   a main body;
   an openable and closable clamp attached to the main body and configured to hold the optical fiber; and
   a movable blade configured to scratch the optical fiber held by the clamp, wherein
   a scrap collection mechanism configured to collect scraps of the cleaved optical fiber is further provided, and
   the scrap collection mechanism includes a case configured to accommodate the scraps, and a lid configured to open and close with respect to the case in conjunction with an opening and closing operation of the clamp, wherein
   the scrap collection mechanism further includes:
      a rotating roller provided in the case and including an upper roller pivotally supported on the lid and a lower roller pivotally supported within the main body, the lower roller being provided with a feed-out portion; and
      a driver configured to transmit a rotational force of the clamp to the lid and the rotating roller, wherein
   the rotating roller is configured to hold and feed out the scraps in a direction away from the clamp by sandwiching the scraps between the upper roller and the feed-out portion of the lower roller, wherein
   the driver transmits a closing operation of the clamp to the lid and does not transmit the closing operation to the rotating roller, wherein
   the driver includes a drive lever configured to interlock with the clamp, and a first gear configured to rotate according to an operation of the drive lever,
   the rotating roller integrally includes a second gear at one end of the rotating roller, and
   the first gear moves toward the second gear and is directly or indirectly engaged with the second gear according to the operation of the drive lever interlocked with the opening operation of the clamp, and moves toward an opposite side of the second gear and is disengaged from the second gear according to an operation of the drive lever interlocked with the closing operation of the clamp.

2. The optical fiber cutter according to claim 1, wherein the clamp and the lid of the scrap collection mechanism are opened and closed by rotating around rotation axes parallel to each other.

* * * * *